United States Patent
Smith

(10) Patent No.: US 6,673,862 B1
(45) Date of Patent: Jan. 6, 2004

(54) VINYL ACETATE ETHYLENE EMULSIONS STABILIZED WITH POLY(ETHYLENE/POLY (VINYL ALCOHOL) BLEND

(75) Inventor: Carrington Duane Smith, Slatington, PA (US)

(73) Assignee: Air Products Polymers, L.P., Allentown, PA (US)

( * ) Notice: Subject to any disclaimer, the term of this patent is extended or adjusted under 35 U.S.C. 154(b) by 0 days.

(21) Appl. No.: 09/458,606

(22) Filed: Dec. 10, 1999

(51) Int. Cl.[7] ............................... C08F 2/16; C08F 2/22
(52) U.S. Cl. ..................... 524/459; 524/457; 524/503; 526/202
(58) Field of Search .................. 524/459, 503, 524/457; 526/202

(56) References Cited

U.S. PATENT DOCUMENTS

| | | | |
|---|---|---|---|
| 3,218,281 A | | 11/1965 | Rees ..................... 260/29.6 |
| 3,301,805 A | * | 1/1967 | Kahrs et al. ............. 524/503 |
| 3,516,975 A | * | 6/1970 | Meincke et al. ......... 526/209 |
| 3,816,362 A | * | 6/1974 | Tsuchihara et al. ...... 524/459 |
| 4,133,791 A | | 1/1979 | Kemenater et al. . 260/29.6 WA |
| 4,921,898 A | | 5/1990 | Lenney et al. ............ 524/459 |
| 4,963,611 A | | 10/1990 | Nagasawa et al. ........ 524/459 |
| 5,070,134 A | | 12/1991 | Oyamada et al. ....... 524/503 F |
| 5,110,856 A | | 5/1992 | Oyamada et al. ........ 524/459 |
| 5,629,370 A | | 5/1997 | Freidzon ................. 524/503 |

FOREIGN PATENT DOCUMENTS

| | | | |
|---|---|---|---|
| EP | 0305585 | 8/1989 | ........ C08F/18/08 |

* cited by examiner

*Primary Examiner*—Judy M. Reddick
(74) *Attorney, Agent, or Firm*—Mary E. Bongiorno; Russell L. Brewer

(57) ABSTRACT

The present invention provides for the production of stable aqueous dispersions of vinyl acetate-ethylene copolymers, preferably at high solids, i.e., greater than 65 wt %, preferably >70% which are useful as adhesives. The vinyl acetate-ethylene copolymer is comprised of polymerized units of vinyl acetate and ethylene in approximately 60–95 wt % and 5–40 wt % respectively. The copolymers are prepared by the emulsion copolymerization of vinyl acetate and ethylene monomers in the presence of a stabilizing system consisting essentially of (1) a poly(vinyl alcohol) which is 75–99+mole % hydrolyzed and has an average degree of polymerization ranging from 100–2200 and (2) a polyethylene glycol having a number average molecular weight of from 200 to 20,000.

7 Claims, No Drawings

VINYL ACETATE ETHYLENE EMULSIONS STABILIZED WITH POLY(ETHYLENE/POLY (VINYL ALCOHOL) BLEND

BACKGROUND OF THE INVENTION

The invention relates to vinyl acetate-ethylene copolymer emulsions and, more particularly, relates to high solids copolymer emulsions. High solids vinyl acetate/ethylene emulsions are characterized as having a solids level of at least 65% to about 75% by weight and having a viscosity of less than 5000 centipoises. Stabilization of high solids, e.g., vinyl acetate/ethylene (VAE) based copolymers prepared by aqueous emulsion polymerization typically has been achieved by the combined use of poly(vinyl alcohol) and nonionic surfactants.

Representative patents showing the production of vinyl acetate/ethylene emulsions and high solids vinyl acetate/ethylene emulsions are as follows:

U.S. Pat. No. 3,218,281 discloses a process for producing vinyl acetate emulsions in the presence of a water soluble emulsifying agent consisting of copolymers of vinyl acetate and polyoxyalkylene compounds, such as copolymers of vinyl acetate and polyoxyethylene glycol.

U.S. Pat. No. 4,133,791 discloses the production of ethylene containing copolymers in the presence of poly(vinyl alcohol) having a molecular weight of from 6000 to 100,000 to a solids content of from 30 to 60% by weight and then evenly distributing polyethylene glycol or a mixture of polyethylene glycol; and polyethylene/propylene glycol in the copolymer dispersion. The resultant viscosity of the dispersion is above 20 Pas.

U.S. Pat. No. 4,921,898 discloses a process for producing high solids VAE compositions by using a stabilizing amount of a poly(vinyl alcohol)/surfactant system consisting essentially of a poly(vinyl alcohol) having a 100–600 degree of polymerization and a nonionic surfactant consisting of a 30–40 ethylene oxide unit substituted alkyl phenol or a 30–40 ethylene oxide unit substituted propylene glycol.

U.S. Pat. No. 4,963,611 discloses the production of vinyl acetate emulsions for use as adhesives and paints employing a water soluble poly(vinyl alcohol) as a stabilizing agent. Example 4 shows the production of a low solids vinyl acetate homopolymer in the presence of poly(vinyl alcohol) and a polyethylene glycol having a molecular weight of 200.

U.S. Pat. No. 5,070,134 disclose a vinyl acetate/ethylene high solids emulsion utilizing a stabilizing system comprised of from 1 to 1.9 parts of poly(vinyl alcohol) having a degree of polymerization from 300 to 1000 and from 1 to 3 parts by weight of a polyoxyethylene nonionic surface active agent having an HLB of 15.5 to 17.5 per 100 parts by weight vinyl acetate.

U.S. Pat. No. 5,110,856 discloses high solids vinyl acetate/ethylene emulsions formed by polymerizing vinyl acetate and ethylene in the presence of a stabilizing system of poly(vinyl alcohol) having a degree of polymerization of 300 to 1000 and from 1 to 3% of a polyoxyethylene surface active agent having an HLB of 16.5 to 17.5.

U.S. Pat. No. 5,629,370 discloses a vinyl acetate/ethylene copolymer emulsion having a solids content of at least 65% by weight. The emulsion is prepared by polymerizing vinyl acetate and ethylene in the presence of a partially hydrolyzed poly(vinyl alcohol) and a mixture of nonionic ethoxylated alkyl phenol surfactants having an HLB of from 16 to 16.5.

EP 0 089 068 discloses a process for producing high solids >70% a viscosity of 5000 mPa·s or less utilizing a stabilizing system comprised of poly(vinyl alcohol) having a degree of hydrolysis of 88% and a polyoxyethylene oxide surfactant such as that sold under the trademark Pluronic.

BRIEF SUMMARY OF THE INVENTION

The present invention provides for the production of stable aqueous dispersions of vinyl acetate-ethylene copolymers having a solids content typically from 55 to 75% by weight and higher, preferably emulsions having a high solids content, i.e., greater than 65 wt %, preferably >70% which are useful as adhesives. They demonstrate surprisingly good speed of set and creep resistance at such high solids level. The vinyl acetate-ethylene copolymer is comprised of polymerized units of vinyl acetate and ethylene in approximately 50–95 wt % and 5–50 wt %, respectively. Optionally, other monomers may be copolymerized therewith.

The copolymers are prepared by the emulsion copolymerization of vinyl acetate and ethylene monomers in the presence of a stabilizing system consisting essentially of (1) poly(vinyl alcohol) which is 75–99+mole % hydrolyzed and has an average degree of polymerization ranging from 100–2200 and (2) a polyethylene glycol having a number average molecular weight of from 200 to 20,000.

The resulting vinyl acetate/ethylene copolymer emulsions will comprise about 55 to about 75 wt % solids, preferably from 65 to 75% solids with a viscosity of less than about 5000, typically less than 3500 cps, preferably less than about 2500 cps at 65% solids or greater and at 60 rpm (Brookfield #4 spindle at 25° C.).

Several advantages can be achieved by the invention:
- increased polymer solids at viscosities comparable to lower solids emulsions;
- excellent resistance to sedimentation and excellent stability of the emulsion;
- accelerated bond formation and adhesive setting speed; and,
- improved creep resistance versus many conventional high solids emulsions.

DETAILED DESCRIPTION OF THE INVENTION

The copolymers according to the invention typically comprise from 50–95 wt % vinyl acetate and 5–50 wt % ethylene to provide a Tg ranging from about −35 to 20° C. Preferably, the copolymer forming adhesive applications contains from 65 to 80 wt % vinyl acetate and 20 to 35 wt % ethylene on a monomer basis. Pressure sensitive adhesive applications may contain ethylene concentrations from about 35 to 45%.

The vinyl acetate-ethylene copolymers may optionally include one or more additional ethylenically unsaturated copolymerizable monomers. Exemplary of such comonomers, which may be present in amounts from 0 to 10 wt %, but preferably less than 5%, e.g., 0.5 to 5% are $C_3-C_{10}$ alkenoic acids, such as acrylic acid, methacrylic acid, crotonic acid and isocrotonic acid and their esters with $C_1-C_{18}$ alkanols, such as methanol, ethanol, propanol, butanol, and 2-ethylhexanol; vinyl halides such as vinyl chlorides; alpha, beta-unsaturated $C_4-C_{10}$ alkenedioic acids such as maleic acid, fumaric acid and itaconic acid and their monoesters and diesters with the $C_1-C_{18}$ alkanols, such as dibutyl maleate and dioctyl maleate; and nitrogen containing monoolefinically unsaturated monomers, particularly nitriles, amides, N-methylol amides, lower alkanoic acid esters of N-methylol amides, lower alkyl ethers of N-methylol amides and allylcarbamates, such as acrylonitrile, acrylamide, methacrylamide, N-methylol acrylamide, N-methylol methacrylamide, N-methylol allylcarbamate, and lower alkyl ethers or lower alkanoic acid esters of N-methylol acrylamide, N-methylol methacrylamide and N-methylol allylcarbamate. If any additional ethylenically unsaturated comonomer is used, about 1–5 wt % is preferred.

The stabilizing system for the copolymerization reaction consists essentially of poly(vinyl alcohol) and polyethylene glycol wherein the poly(vinyl alcohol) is present in an amount of from 1–4 wt %, preferably 2 to 3 wt % by weight of copolymer and from 1–4 wt %, preferably 2–3 wt % of the polyethylene glycol, said polyethylene glycol having a number average molecular weight of from 200 to 20,000 by weight of the copolymer. (Typically, the poly(vinyl alcohol) and polyethylene glycol are based upon the total weight of the monomers charged to the polymerization.) The poly (vinyl alcohol) which is used in the stabilizing system can be 75–99+mole % hydrolyzed, preferably 85–90 mole % and especially 87–89 mole % hydrolyzed and has a degree of polymerization ranging from 100 to 2200, preferably, 140 to 1000, and most preferably 200 to 700. Another means for assessing the degree of polymerization of the poly(vinyl alcohol) is its viscosity as a 4 wt % aqueous solution at 20° C. Suitable poly(vinyl alcohol)s will have a viscosity ranging from 2 to about 50, preferably 2.5 to 7 for higher solids emulsions.

As stated the stabilizer system according to the invention also contains a polyethylene glycol at a level from about 1–4 wt %, preferably 2–3 wt %, based on copolymer. Polyethylene glycols are widely known and include those materials sold under the trademark Carbowax. They should have a number average molecular weight of from 200 to 20,000. When producing emulsions having conventional solids level, e.g., 55 to 60% by weight, a wide range of polyethylene glycols may be used as stated with preferred polyethylene glycols having a molecular weight from 600 to 8000. High solids emulsions of greater than 65% solids having excellent stability and employ a stabilizing system of poly (vinyl alcohol) and polyethylene glycol with preferred polyethylene glycols having a molecular weight of from about 500 to 2000. The polyethylene glycols permit the formation of emulsions having substantially lower viscosity.

The stabilizing agent consisting essentially of the poly (vinyl alcohol) and polyethylene glycol should be used in an amount of from about 3 to 8%, preferably 4 to 6% by weight of the total monomer polymerized. If a lesser amount is employed, the system may coagulate because of insufficient stabilization.

The weight ratio of poly(vinyl alcohol) to polyethylene glycol should range from about 40 to 60 parts poly(vinyl alcohol) to 60 to 40 parts polyethylene glycol on a 100 weight basis of total stabilizer system. The balance should consist of the polyethylene glycol. Optionally, small amounts, e.g., 5 to 20% by weight of the total stabilizing system may be made up of other conventional, and compatible, surfactants. Generally, though it is not necessary to add further surfactants to produce a stable emulsion.

Various free-radical forming sources can be used in carrying out the polymerization of the monomers, such as peroxide compounds. Combination-type systems employing both reducing agents and oxidizing agents can also be used, i.e. a redox system. Suitable reducing agents, or activators, include bisulfites, sulfoxylates, or other compounds having reducing properties such as ascorbic acid, erythorbic acid and other reducing sugars. The oxidizing agents include hydrogen peroxide, organic peroxide such as t-butyl hydroperoxide and the like, persulfates, such as ammonium or potassium persulfate, and the like. Specific redox systems which can be used include hydrogen peroxide and zinc formaldehyde sulfoxylate; hydrogen peroxide and erythorbic acid; hydrogen peroxide, ammonium persulfate or potassium persulfate with sodium metabisulfite, sodium bisulfite, ferrous sulfate, zinc formaldehyde sulfoxylate or sodium formaldehyde sulfoxylate.

The oxidizing agent is generally employed in an amount of 0.01–1%, preferably 0.05–0.5%, based on the weight of the vinyl acetate introduced into the polymerization system. The reducing agent is ordinarily added in an aqueous solution in the necessary equivalent amount.

In general, suitable vinyl acetate-ethylene copolymer emulsions can be prepared by the copolymerization of the monomers in the presence of the poly(vinyl alcohol)-polyethylene glycol stabilizing system in an aqueous medium under pressures up to about 100 atm and in the presence of a redox system which is added incrementally, the aqueous system being maintained by a suitable buffering agent at a pH of about 2–6. The process first involves homogenization in which the vinyl acetate suspended in water is thoroughly agitated in the presence of ethylene under the working pressure to effect solution of the ethylene in the vinyl acetate while the reaction medium is gradually heated to polymerization temperature. The homogenization period is followed by a polymerization period during which the redox system is added incrementally.

The reaction temperature can be controlled by the rate of redox addition and by the rate of heat dissipation. Generally, it is advantageous to maintain a mean temperature of about 55 to 90° C. during the polymerization of the monomers. While temperatures as low as zero degrees can be used, economically the lower temperature limit is about 50° C.

The reaction time will depend upon the variables such as the temperature, the free radical forming source and the desired extent of polymerization. It is generally desirable to continue with the reaction until less than 0.5% of the vinyl acetate remains unreacted. While the reaction time of the polymerization process will vary as mentioned above, the use of the stabilizing system according to the invention not only provides a high solids vinyl acetate-ethylene copolymer emulsion but also provides for emulsion polymerization in a surprisingly shorter reaction time, i.e. the polymerization reactor cycle time is significantly decreased by virtue of higher polymerization temperatures.

In carrying out the polymerization, an amount of the vinyl acetate is initially charged to the polymerization vessel and saturated with ethylene. Most advantageously, at least about 50% of the total vinyl acetate to be polymerized is initially charged and the remainder of the vinyl acetate is added incrementally during the course of the polymerization. The charging of all the vinyl acetate initially is also contemplated with no additional incremental supply. When reference is made to incremental addition, substantially uniform additions, both with respect to quantity and time, are contemplated. Such additions can be continuous or discontinuous and are also referred to as "delay" additions.

The quantity of ethylene entering into the copolymer is influenced by pressure, the agitation (mixing) and viscosity of the polymerization medium. Thus, to increase the ethylene content of the copolymer, high pressures, greater agitation and a low viscosity are employed.

The process of forming the vinyl acetate-ethylene copolymer emulsion generally comprises the preparation of an aqueous solution containing the stabilizing system and, optionally, the pH buffering system. This aqueous solution and the initial or total charge of the vinyl acetate are added to the polymerization vessel and ethylene pressure is applied to the desired value. The pressurized ethylene source can be shut off from the reactor so that the ethylene pressure decays as it is polymerized or it can be kept open to maintain the ethylene pressure throughout the reaction, i.e. make-up ethylene. As previously mentioned, the mixture was thoroughly agitated to dissolve ethylene in the vinyl acetate and in the water phase. Conveniently, the charge is brought to polymerization temperature during this agitation period. The polymerization is then initiated by introducing initial amounts of the oxidant, the reductant having been added with the initial charge. After polymerization has started, the oxidant and reductant are incrementally added as required to continue polymerization. Any third copolymerizable monomer and the remaining vinyl acetate, if any, may be added as separate delays.

As mentioned, the reaction is generally continued until the residual vinyl acetate content is below about 0.5%. The completed reaction product is then allowed to cool to about room temperature while sealed from the atmosphere. The pH is then suitably adjusted to a value in the range of 4.5 to 7, preferably 4.5 to 5, to insure maximum stability.

Vinyl acetate-ethylene copolymer emulsions can be directly produced having a solids content of about 55 to 75%, and preferably from 65–75% sand having a viscosity of less than about 5000 cps, generally less than 3500 cps and preferably less than about 2500 cps and most desirably less than about 1500 cps, at 65% solids and at 60 rpm and 25° C.

The following examples are intended to illustrate various embodiments of the invention and are not intended to restrict the scope thereof.

COMPARATIVE EXAMPLE 1

5% Poly(Vinyl Alcohol) Stabilized High Solids VAE Emulsion

The following is a general procedure for preparing VAE copolymer emulsions at higher solids utilizing poly(vinyl alcohol) alone to produce a 60% solids emulsion using a 1 gallon stainless steel pressure reactor:
The reactor is charged with the following mixture:

| Material | Mass charged in grams |
| --- | --- |
| DI Water | 65 |
| Ferrous Ammonium Sulfate (1% aqueous solution) | 3.0 |
| Airvol ® 203 (15% aqueous solution)* | 740 (5%) |
| 40% Phosphoric acid aqueous solution | 3.81 |
| Ethylene | 350 |
| Vinyl Acetate | 1800 |

* % Airvol poly(vinyl alcohol) on a dry basis based on weight of vinyl acetate and ethylene.
Airvol ® 203 poly(vinyl alcohol) having a mole % hydrolysis of 87–89, a degree of polymerization within a range of 150 to 350, typically about 235 and a viscosity of 3.5–4.5 cps in a 4% aqueous solution at 20° C.

The following delay mixtures were utilized:

| Material | Mass utilized in grams |
| --- | --- |
| Aqueous 0.7% $H_2O_2$ | 273 |
| Aqueous 6.0% $H_2O_2$ | 58 |
| Aqueous 7.5% SFS | 119 |
| Ethylene | 64 |

PVOH refers to poly(vinyl alcohol)
SFS refers to sodium formaldehyde sulfoxylate.

The initial distilled water/Airvol® poly(vinyl alcohol) mixture is adjusted to pH 3.6 with phosphoric acid. Ferrous ammonium sulfate is added and the initial aqueous solution is added to the previously nitrogen purged 1 gallon reactor. Next, agitation at 200 rpm is begun and the vinyl acetate is charged. Nitrogen and ethylene were used to purge the reactor at 30 psig. The agitation is increased to 900 rpm and the mixture is heated to 38° C. Ethylene is weighed into the reactor over 45 min., subsurface. Next, 7.0 mls of the aqueous SFS solution is added midway through ethylene charge. Fifteen minutes were allowed for equilibration. Addition of 0.7% hydrogen peroxide and 7.5% aqueous SFS were commenced at 0.3 ml/min. Once initiation occurred, the flow rate of the SFS solution is increased to 0.35 ml/min. and the temperature is ramped 65° C. over a 30 min period. Once at 65° C., the addition of dilute hydrogen peroxide is adjusted to maintain a 14 degC. delta temperature between the reaction and the jacket temperature (i.e., jacket temperature around 51 degC.). The delayed ethylene is added. When the free monomer content dropped to about 4%, the dilute $H_2O_2$ solution feed is stopped and the aqueous 6.0% $H_2O_2$ solution feed is started; both peroxide and SFS addition rates were increased to 1.0 ml/min. These additions were continued until complete addition of both aqueous delays is effected. Next, the reaction is cooled to 30 degC., pH adjusted to 4.0 with aqueous ammonium hydroxide, and transferred to a degasser. During this transfer, the agitation rate in the degasser is 200 rpm and 0.5 gms Colloid 675 is added in a small amount of water. In the degasser, a solution of tert-butyl hydroperoxide (7.8 gms of TBHP 70% in 55 gms of water) is pumped in at 1.5 ml/min. This post treatment is typically for several hours.

Numerous properties of the resulting emulsion were measured as follows:

| STABILIZER: | Airvol 203 |
| --- | --- |
| Accel Seds % | 1.0 |
| Tg onset (deg C.) | −6.0 |
| Viscosity (60/12 RPM) (cps) | 2760/4100 |
| 100/325 mesh grit (ppm) | 1250/424 |
| % solids | 60.3 |

This example shows that it is difficult to prepare a poly(vinyl alcohol) stabilized VAE above about 60% solids with 5 weight % poly(vinyl alcohol) based on total monomer or 6.1% based upon the weight of vinyl acetate and maintain a viscosity of less than 3000 cps. High in-process viscosity requires the use of excessive dilute peroxide.

COMPARATIVE EXAMPLE 2

2.5% Poly(Vinyl Alcohol) Stabilized VAE Emulsion

The following general procedure is similar to Example 1 except that the level of poly(vinyl alcohol) was reduced to 2.5 wt % based on total monomer. Since 5% PVOH was ineffective, the effect of a lower level of poly(vinyl alcohol) was evaluated for preparing low viscosity VAE copolymer emulsions using a 1 gallon stainless steel pressure reactor. It was thought the higher level of poly(vinyl alcohol) (Example 1) may have contributed to high viscosity. Also, the solids content was reduced to 55% to increase the possibility of preparing a stable emulsion.
The reactor was charged with the following mixture:

| Material | Mass charged in grams |
| --- | --- |
| DI Water | 709.7 |
| Ferrous Ammonium Sulfate (1% aqueous solution) | 3.0 |

-continued

| Material | Mass charged in grams |
|---|---|
| Airvol ® 203 (10% aqueous solution) | 461.5 (2.5%) |
| 40% Phosphoric acid aqueous solution | 3.14 |
| Ethylene | 320 |
| Vinyl Acetate | 1500 |

* % Airvol poly(vinyl alcohol) on a dry basis based on weight of vinyl acetate and ethylene.

The following delay mixtures were utilized:

| Material | Mass utilized in grams |
|---|---|
| Aqueous 0.7% $H_2O_2$ | 91 |
| Aqueous 6.0% $H_2O_2$ | 58 |
| Aqueous 7.5% SFS | 114 |
| Ethylene | 25 |

The initial mixture was adjusted to pH 3.6 with phosphoric acid. Ferrous ammonium sulfate was added and the initial aqueous solution was added to the previously nitrogen purged 1 gallon reactor. Next, agitation at 200 rpm was begun and the vinyl acetate was charged. Nitrogen and ethylene were used to purge the reactor at 30 psig. The agitation was increased to 900 rpm and the mixture was heated to 38° C. Ethylene was weighed into the reactor over 45 min., subsurface. Next, 7.0 mls of the aqueous SFS solution was added midway through ethylene charge. Fifteen minutes were allowed for equilibration. Addition of 0.7% hydrogen peroxide and 7.5% aqueous SFS were commenced at 0.3 ml/min. Once initiation occurred, the flow rate of the SFS solution was increased to 0.35 ml/min. and the temperature was ramped 65° C. over a 30 min period. Once at 65° C., the addition of dilute hydrogen peroxide was adjusted to maintain a 14 degC. delta temperature between the reaction and the jacket temperature (i.e. jacket temperature around 51 degC.). The delayed ethylene was added. When the free monomer content dropped to about 4%, the dilute $H_2O_2$ solution feed was stopped. The pH was adjusted to 4.5 and the aqueous 6.0% $H_2O_2$ solution feed was started; both peroxide and SFS addition rates were increased to 1.0 ml/min. These additions were continued until complete addition of both aqueous delays was effected. Next, the reaction was cooled to 30 degC., pH adjusted to 5.3 with aqueous ammonium hydroxide, and transferred to a degasser. During this transfer, the agitation rate in the degasser was 200 rpm and 0.5 gms Colloid 675 was added in a small amount of water. In the degasser, a solution of tert-butyl hydroperoxide (7.8 gms of TBHP 70% in 55 gms of water) was pumped in at 1.5 ml/min. This post treatment is typically for several hours.

Numerous properties of the resulting emulsion were measured as follows:

| STABILIZER: | Airvol ® 203 (2.5 weight %) |
|---|---|
| Accel Seds % | 10 |
| Tg onset (deg C.) | n/a |
| Viscosity (12 RPM) (cps) | 80 |
| 100/325 mesh coagulum (ppm) | 177/>20,000 |
| % solids | 54.1 |

This example shows that, according to prior art, it is not possible to prepare a stable 55% solids VAE emulsion using solely PVOH at a level of 2.5 weight % on total monomer to prepare a stable latex. The high levels of accelerated sedimentation and coagulum are unacceptable for latex stability.

COMPARATIVE EXAMPLE 3

Polyethylene Glycol Stabilized 55% Solids VAE Emulsion

The procedure of Example 2 was repeated except that polyethylene glycol was used in an effort to stabilize a 55% solids emulsion in place of solely poly(vinyl alcohol) or polyethylene glycol. The procedure is outlined below:
The reactor was charged with the following mixture:

| Material | Mass charged in grams |
|---|---|
| DI Water | 1045 |
| Ferrous Ammonium Sulfate (1% aqueous solution) | 3.0 |
| Carbowax ® PEG 8000* | 92.4 (5%) |
| 40% Phosphoric acid aqueous solution | 1.0 |
| Ethylene | 320 |
| Vinyl Acetate | 1500 |

* % Carbowax based on weight of vinyl acetate and ethylene. Carbowax PEG-8000 is a brand of polyethylene glycol having a number average molecular weight of 8000.

The following delay mixtures were utilized:

| Material | Mass utilized in grams |
|---|---|
| Aqueous 0.7% $H_2O_2$ | 103 |
| Aqueous 6.0% $H_2O_2$ | 57 |
| Aqueous 7.5% SFS | 114 |
| Ethylene | 25 |

When the free monomer content dropped to about 4%, the dilute $H_2O_2$ solution feed is stopped and the aqueous 6.0% $H_2O_2$ solution feed is started; both peroxide and SFS addition rates were increased to 1.0 ml/min. Shortly after these additions had begun, the polymerization began to coagulate and the reaction was terminated.

This example shows that PEG alone may not be used to homostabilize a VAE emulsion polymerization at solids levels approaching 55% by weight.

EXAMPLE 4

Preparation of a Poly(Vinyl Alcohol)/Polyethylene Glycol Co-stabilized 55% Solids VAE Emulsion The procedure of Example 3 was repeated except that a blend of poly(vinyl alcohol) and polyethylene glycol was used to stabilize the emulsion in place of poly(vinyl alcohol) or polyethylene glycol alone. The procedure is outlined below:

The reactor is charged with the following mixture:

| Material | Mass charged in grams |
| --- | --- |
| DI Water | 862 |
| Ferrous Ammonium Sulfate (1% aqueous solution) | 3.0 |
| Carbowax ® PEG 8000* | 46.2 (2.5%) |
| Airvol ® 203 (15% aqueous solution)* | 308 (2.5%) |
| 40% Phosphoric acid aqueous solution | 1.67 |
| Ethylene | 320 |
| Vinyl Acetate | 1500 |

* % Carbowax based on weight of vinyl acetate and ethylene.
* % Airvol poly(vinyl alcohol) on a dry basis based on weight of vinyl acetate and ethylene.

The following delay mixtures were utilized:

| Material | Mass utilized in grams |
| --- | --- |
| Aqueous 0.7% $H_2O_2$ | 103 |
| Aqueous 6.0% $H_2O_2$ | 57 |
| Aqueous 7.5% SFS | 114 |
| Ethylene | 25 |

The initial distilled water/Airvol® PVOH/Carbowax® PEG mixture was adjusted to pH 3.6 with phosphoric acid. Ferrous ammonium sulfate was added and the initial aqueous solution was added to the previously nitrogen purged 1 gallon reactor. Next, agitation at 200 rpm was begun and the vinyl acetate was charged. Nitrogen and ethylene were used to purge the reactor at 30 psig. The agitation was increased to 900 rpm and the mixture was heated to 38° C. Ethylene was weighed into the reactor over 45 min., subsurface. Next, 7.0 mls of the aqueous SFS solution was added midway through ethylene charge. Fifteen minutes were allowed for equilibration. Addition of 0.7% hydrogen peroxide and 7.5% aqueous SFS were commenced at 0.3 ml/min. Once initiation occurred, the flow rate of the SFS solution was increased to 0.35 ml/min. and the temperature was ramped 65° C. over a 30 min period. Once at 65° C., the addition of dilute hydrogen peroxide was adjusted to maintain a 14 degC. delta temperature between the reaction and the jacket temperature (i.e. jacket temperature around 51 degC.). The delayed ethylene was added. When the free monomer content dropped to about 4%, the dilute $H_2O_2$ solution feed was stopped. The pH was adjusted to 4.5 and the aqueous 6.0% $H_2O_2$ solution feed was started; both peroxide and SFS addition rates were increased to 1.0 ml/min. These additions were continued until complete addition of both aqueous delays was effected. Next, the reaction was cooled to 30 degC., pH adjusted to 5.3 with aqueous ammonium hydroxide, and transferred to a degasser. During this transfer, the agitation-rate in the degasser was 200 rpm and 0.5 gms Colloid 675 was added in a small amount of water. In the degasser, a solution of tert-butyl hydroperoxide (7.8 gms of TBHP 70% in 55 gms of water) was pumped in at 1.5 ml/min. This post treatment is typically for several hours.

Numerous properties of the resulting emulsion were measured as follows:

| STABILIZER: | Airvol ® 203/PEG 8000 |
| --- | --- |
| Accel Seds % | 3.0 |
| Tg onset (deg C) | −8.9 |
| Viscosity (60/12 RPM) (cps) | 100/120 |
| 100/325 mesh grit (ppm) | 460/34 |
| % solids | 56 |
| Cloth to cloth dry adhesion (pli) | 12.1 |
| Cloth to cloth wet adhesion (pli) | 2.4 |
| Dry/Wet ratio (strength retention) % | 20 |
| PVC to cloth adhesion (pli) | 2.5 |
| Creep Resistance (mm/min) | 0.018 |

This example shows that mixtures of partially hydrolyzed poly(vinyl alcohol) and PEG may be used to stabilize a VAE emulsion polymerization (~55% solids). Note that neither poly(vinyl alcohol) nor the polyethylene glycol (Examples 2 and 3) could be used at these levels to obtain an emulsion having such low viscosity and low sedimentation. Although solids levels are below that required to meet "high solids" definitions, the viscosity is low compared to Example 1.

This material is useful as an adhesive. Creep values are indicative of the heat resistance of materials. The lower the value of creep indicates better heat resistance. Airflex® 400, a commercially available 55% solids VAE latex stabilized by polyvinyl alcohol, has creep values in the range of 0.02–0.04 mm/min. Airflex® 465, a commercially available 65% solids VAE latex stabilized by polyvinyl alcohol and surfactant, has creep values in the range of 0.06–0.08 mm/min, indicative of poorer heat resistance. Surprisingly, materials of this invention display creep values consistent with a solely PVOH stabilized VAE material even though the PVOH content is much lower.

When this example was repeated with higher molecular weight PEG or higher molecular weight PVOH, the resulting 55% solids emulsion viscosities were likewise higher.

EXAMPLE 5

Preparation of a Poly(Vinyl Alcohol)/PEG Co-stabilized VAE High Solids Emulsion

The procedure of Example 4 was repeated except the water level was reduced in order to produce a high solids VAE emulsion. The procedure is outlined below:

The reactor was charged with the following mixture:

| Material | Mass charged in grams |
| --- | --- |
| DI Water | 380 |
| Ferrous Ammonium Sulfate (1% aqueous solution) | 3.0 |
| Carbowax ® PEG-8000* | 55.4 (2.5%) |
| Airvol ® 203 (15% aqueous solution)* | 369 (2.5%) |
| 40% Phosphoric acid aqueous solution | 2.01 |
| Ethylene | 350 |
| Vinyl Acetate | 1800 |

*% based upon weight of vinyl acetate and ethylene.

The following delay mixtures were utilized:

| Material | Mass utilized in grams |
|---|---|
| Aqueous 0.7% $H_2O_2$ | 190 |
| Aqueous 6.0% $H_2O_2$ | 57 |
| Aqueous 7.5% SFS | 116 |
| Ethylene | 64 |

Numerous properties of the resulting emulsion were measured as follows:

| STABILIZER: | Airvol ® 203/PEG 8000 |
|---|---|
| Accel Seds % | 1.0 |
| Tg onset (deg C) | −10.3 |
| Viscosity (60/12 RPM) (cps) | 4780/7850 |
| 100/325 mesh grit (ppm) | 1006/74 |
| % solids | 65 |
| Cloth to cloth dry adhesion (pli) | 13.4 |
| Cloth to cloth wet adhesion (pli) | 2.3 |
| Dry/Wet ratio (strength retention) % | 17 |
| PVC to cloth adhesion (pli) | 2.6 |
| Creep Resistance (mm/min) | 0.015 |

This example shows that mixtures or blends of partially hydrolyzed poly(vinyl alcohol) and PEG as described in Example 4 may be used to produce and stabilize a high solids VAE emulsion polymerization. Sedimentation also is quite low. Neither the poly(vinyl alcohol) nor the PEG alone could be used at these levels to stabilize a 65+% solids emulsion.

This material is useful as an adhesive as described in Example 4. Again, the very low creep values were indicative of excellent heat resistance.

When this example was repeated with lower molecular weight PEG materials, viscosities of the resulting 65% solids emulsions likewise were lower. As the ratio of PEG:PVOH changed from 1:1 to 3.2:1 the stability of the high solids emulsion was somewhat poorer, but acceptable, while viscosity was quite low. By the same process, with higher vinyl acetate in the initial charge, higher solids (72%) could be prepared with viscosities of less than 4000 cps.

EXAMPLE 6

High Solids VAE Using Fully Hydrolyzed PVQH/PEG Stabilizing System

The following is a general procedure for preparing VAE copolymer emulsions using a 1 gallon stainless steel pressure reactor:

The reactor was charged with the following mixture:

| Material | Mass charged in grams |
|---|---|
| DI Water | 264 |
| Ferrous Ammonium Sulfate (1% aqueous solution) | 4.8 |
| Carbowax ® PEG-4600 | 55.5 (2.5%) |
| Airvol ® 203 (10% aqueous solution) | 339 (1.5%) |
| Airvol ® 107 (10% aqueous solution) | 220 (1.0%) |
| 40% Phosphoric acid aqueous solution | 2.44 |
| Ethylene | 420 |
| Vinyl Acetate | 1755 |

* % Carbowax and Airvol poly(vinyl alcohol) on a dry basis based on weight of vinyl acetate and ethylene.

The following delay mixtures were utilized:

| Material | Mass utilized in grams |
|---|---|
| Aqueous 0.6% $H_2O_2$ | 5 |
| Aqueous 1.0% $H_2O_2$ | 89 |
| Aqueous 7.0% $H_2O_2$ | 69 |
| Aqueous 10% SFS | 117 |
| Ethylene | 50 |

The initial distilled water/Airvol® PVOH/Carbowax® PEG mixture was adjusted to pH 3.5 with phosphoric acid. Ferrous ammonium sulfate was added and the initial aqueous solution was added to the previously nitrogen purged 1 gallon reactor. Next, agitation at 200 rpm was begun and the vinyl acetate was charged. Nitrogen and ethylene were used to purge the reactor at 30 psig. The agitation was increased to 900 rpm and the mixture was heated to 30° C. Ethylene was weighed into the reactor over 45 min., subsurface. Fifteen minutes were allowed for equilibration. Addition of 0.6% hydrogen peroxide (0.4 ml/min) and 10% aqueous SFS (0.6 ml/min) were commenced. Once initiation occurred, the hydrogen peroxide delay was switch to the 1% solution at 0.4 ml/min and the temperature was ramped to 60° C. over a 60 min period, during which time the peroxide flow rate was increased to 0.8 ml/min. Once at 60° C., the addition of dilute hydrogen peroxide was adjusted to maintain a 14 degC. delta temperature between the reaction and the jacket temperature (i.e. jacket temperature around 46 degC.) and the SFS addition was stopped. The delayed ethylene was added. When the free monomer content dropped to about 3%, the dilute H2O2 solution feed was stopped. The aqueous 7.0% H2O2 solution feed was started at about 1 ml/min and the SFS flow was started again; both peroxide and SFS addition rates were increased to 1.0 ml/min. These additions were continued until complete addition of both aqueous delays was effected. Next, the reaction was cooled to 30 degC., pH adjusted to 4.5 with aqueous ammonium hydroxide, and transferred to a degasser. During this transfer, the agitation rate in the degasser was 200 rpm and 0.5 gms Colloid 675 was added in a small amount of water. In the degasser, a solution of tert-butyl hydroperoxide (7.8 gms of TBHP 70% in 55 gms of water) was pumped in at 1.5 ml/min. This post treatment is typically for several hours.

Numerous properties of the resulting emulsion were measured as follows:

| STABILIZER: | Airvol ® 203/Airvol 107/PEG 4600 |
|---|---|
| Accel Seds % | 1.2 |
| Tg onset (deg C) | −5.3 |
| Viscosity (12 RPM) (cps) | 4600 |
| 100/325 mesh coagulum (ppm) | 256/198 |
| % solids | 66 |

This example shows that mixtures of partially and fully hydrolyzed PVOH and PEG may be used to stabilize a high solids VAE emulsion polymerization. This material is useful as an adhesive.

EXAMPLE 7

Effect of Stabilizer on VAE Emulsions

A series of high solids emulsions was prepared using poly(vinyl alcohol) alone, polyethylene glycol alone and in combination with each other. Tables 1 and 2 set forth the conditions and testing including a summary of previous examples.

TABLE 1

| | Run Number | | | | | | | | |
|---|---|---|---|---|---|---|---|---|---|
| | 1 | 2 | 3 | 4 | 5 | 6 | 7 | 8 | 9 |
| Example | | Example 2 | Example 1 | | Example 4 | | Example 5 | | Example 6 |
| Stabilizer Type/(Level %) | PEG 0 | PEG 0 | PEG 0 | PEG 0 | PEG 8000 (2.5) | PEG 1450 (2.5) | PEG- 8000 (2.5) | PEG 4600 (2.5) | PEG 1000 (2.5) |
| Stabilizer Type/(Level %) | PVOH V-203 (5.0) | PVOH V-203 (2.5) | PVOH V-203 (5.0) | PVOH V-203 (2.5) | PVOH V-203 (2.5%) | PVOH V-523 (2.5) | PVOH V-203 (2.5) | PVOH V-203 (2.5) | PVOH V-203 (1.5) |
| Costabilizer (Level) | | | | | | | | | A-107 (1.0) |
| Tg onset | −1.5 | not measured | −6.1 | not measured | −8.9 | 2 | −10.3 | not measured | −3.8 |
| Viscosity (12 RPM) | 600 | 80 | 4100 | 1100 | 120 | 1450 | 7850 | 5050 | 1100 |
| 100/325 mesh grit | 340/16 | 177/>20,000 | 1250/424 | 120/227 | 460/34 | 352/84 | 1006/74 | 479/535 | 240/186 |
| Accel Seds % | 2 | 10 | 1 | 10 | 3 | 1 | 1 | 3 | 1.5 |
| % solids | 56 | 54 | 60 | 66 | 56 | 54 | 65 | 65 | 65 |

Airvol 523 poly(vinyl alcohol) has a mole % hydrolysis of from 87–89% and a solution viscosity of about 23–27 (4% solution at 20° C.)

Table 1-Run 1 shows the known ability to prepare high quality 55% solids VAE emulsion using 5 wt % PVOH as stabilizer. When the amount of PVOH was reduced from 5 wt % to 2.5 wt % on total monomer to lower viscosity, the emulsion quality was poor (Run 2). At higher solids, neither 5% PVOH nor 2.5% PVOH were able to solely stabilize these emulsions (Runs 3 and 4). Runs 5 and 6 show the ability to prepare high quality VAE ~55% solids emulsions in the presence of 2.5 wt % of both PVOH and PEG, whereas these emulsions cannot be stabilized by 2.5 wt % of either component. Viscosity of the 55% solids emulsions were controlled by the molecular weights of poly(vinyl alcohol) and polyethylene glycol. Runs 7–9 show the ability to also prepare high quality, high solids emulsions utilizing various PVOH/PEG stabilizing systems. Viscosities in Runs 7 and 8 were high but it should be noted high solid, water resistant emulsions of low Accel Seds and high stability were produced. When a polyethylene glycol was used of lower molecular weight, the viscosity was well within the desired range.

TABLE 2

| Run Number | 1 | 2 | 3 | 4 | 5 | 6 |
|---|---|---|---|---|---|---|
| Stabilizer Type/(Level %) | PEG 1,000 (2.5) | PEG 600 (2.5) | PEG 600 (3.8%) | PEG 1450 (2.5) | PEG- 1450 (2.5) | PEG 20,000 (2.5) |
| Stabilizer Type/(Level %) | PVOH V-203 (2.5) | PVOH V-203 (2.5) | PVOH V-203 (1.2%) | PVOH V-203 (2.5) | PVOH V-203 (2.5) | PVOH V-203 (2.5) |
| Tg onset | | −3.8 | −7.2 | −2.9 | −6.08 | −10.8 |
| Viscosity (12 RPM) | 3050 | 1100 | 170 | 600 | 3660 | 600 |
| 100/325 mesh grit | 85/200 | 240/186 | 130/1184 | 594/342 | 766/120 | 592/500 |
| Free Monomer | 0.9 | 0.6 | 0.7 | 0.7 | 0.65 | |
| Accel Seds % | 2.5 | 1.5 | 5 | 1 | 1 | 3.5 |
| % solids | 65 | 65 | 64 | 66 | 72 | 55 |

The results in Table 2 show the synthesis of a wide range of vinyl acetate/ethylene emulsions using PVOH and PEG.

Runs 1–6 show the synthesis of high solids VAE emulsions with low accelerated sedimentation, low viscosities and at high solids.

What is claimed is:

1. In a process for producing a vinyl acetate-ethylene copolymer emulsion comprising an aqueous colloidal dispersion of a copolymer containing 50–95 wt % vinyl acetate and 5–50 wt % ethylene prepared by the emulsion copolymerization of vinyl acetate and ethylene monomers in the presence of a poly(vinyl alcohol), the improvement for producing a vinyl acetate-ethylene copolymer emulsion having a solids content of from 65% to 75% by weight which comprises:

polymerizing said vinyl acetate and ethylene monomers in the presence of a stabilizing system consisting essentially of a poly(vinyl alcohol) which has degree of polymerization 100 to 2200 and a polyethylene glycol having a number average molecular weight of from 200 to 20,000.

2. The process of claim 1 in which the poly(vinyl alcohol) is 75–99+mol % hydrolyzed.

3. The process of claim 1 in which the polyethylene glycol has a number average molecular weight of from 500 to 2000.

4. The process of claim 3 in which the solids content is from 65 to 75% by weight, the vinyl acetate content is from 65 to 80% by weight and the ethylene content is from 20–35% by weight.

5. The process of claim 4 wherein the stabilizing system is employed in an amount of from 3 to 8% by weight of total monomers polymerized.

6. The process of claim 5 wherein the stabilizing system consists essentially of poly(vinyl alcohol) and polyethylene glycol and the weight ratio of poly(vinyl alcohol) to polyethylene glycol is from about 40 to 60 parts poly(vinyl alcohol) to 60 to 40 weight parts polyethylene glycol based on 100 weight parts of the stabilizing system.

7. The process of claim 6 wherein the content of poly(vinyl alcohol) is from 2–3% by weight and the content of polyethylene glycol is from 2–3% by weight.

* * * * *

UNITED STATES PATENT AND TRADEMARK OFFICE
CERTIFICATE OF CORRECTION

PATENT NO. : 6,673,862 B1
DATED : January 6, 2004
INVENTOR(S) : Carrington Duane Smith It is certified that error appears in the above-identified patent and that said Letters Patent is hereby corrected as shown below:

<u>Title page,</u>
Item [54], delete title and insert therefor -- VINYL ACETATE ETHYLENE EMULSIONS STABILIZED WITH POLY(ETHYLENE GLYCOL)/POLY (VINYL ALCOHOL) BLEND --.

Signed and Sealed this

Fourth Day of May, 2004

JON W. DUDAS
*Acting Director of the United States Patent and Trademark Office*